Dec. 22, 1925.

R. W. ROBERTSON 1,566,924

PULLEY ATTACHMENT FOR TRACTORS

Filed July 6, 1925

Inventor
Richard W. Robertson
By
Attorneys

Patented Dec. 22, 1925.

1,566,924

UNITED STATES PATENT OFFICE.

RICHARD W. ROBERTSON, OF PLYMOUTH, WISCONSIN, ASSIGNOR TO PLYMOUTH FOUNDRY & MACHINE COMPANY, OF PLYMOUTH, WISCONSIN, A CORPORATION OF WISCONSIN.

PULLEY ATTACHMENT FOR TRACTORS.

Application filed July 6, 1925. Serial No. 41,826.

*To all whom it may concern:*

Be it known that I, RICHARD W. ROBERTSON, a citizen of the United States, and resident of Plymouth, in the county of Sheboygan and State of Wisconsin, have invented certain new and useful Improvements in Pulley Attachments for Tractors; and I do hereby declare that the following is a full, clear, and exact description thereof.

This invention relates to pulley attachment for tractors.

Objects of this invention are to provide a pulley attachment for tractors which utilizes the standard gear and pulley and similar parts regularly found upon tractors of certain types, such for instance as those known as Fordson tractors, although the invention is applicable to other types of tractors.

Further objects are to provide an attachment for tractors for controlling the driving or power pulley, which has a novel oiling system, which is so constructed that the oil will not leak from the system under normal conditions, nor will it leak even though the tractor is tilted downwardly towards the pulley side, and to provide means associated with the belt pulley control which permits a relatively rapid circulation of oil in the device while the gears are in operative engagement and which permits a gradual draining of the device when the gears are out of engagement.

An embodiment of the invention is shown in the accompanying drawings, in which:—

Figure 1:
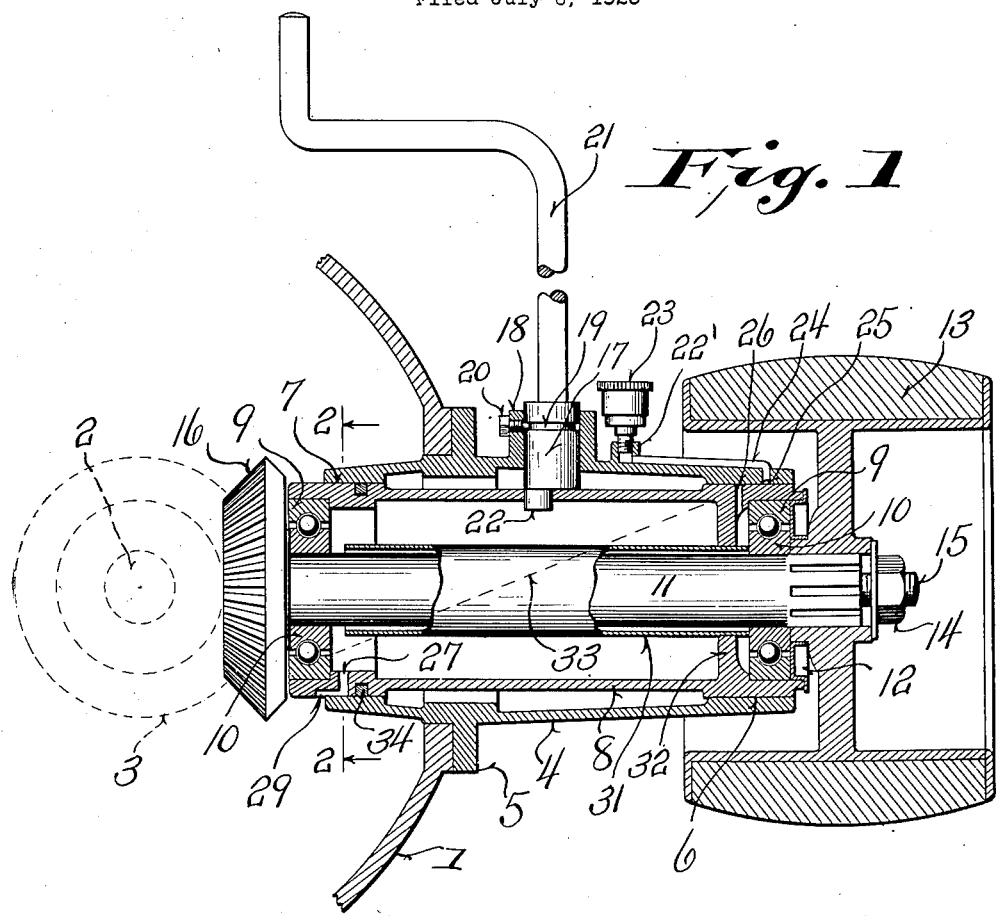
Figure 1 is a sectional view through the attachment and through a portion of the tractor.
Figure 2:
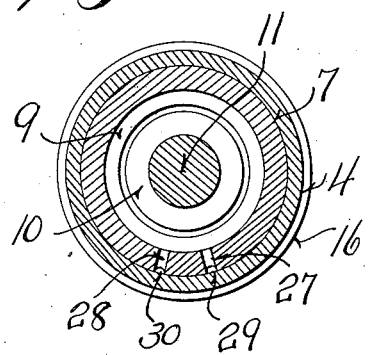
Figure 2 is a transverse sectional view on the line 2—2 of Figure 1.

Referring to the drawings, it will be seen that the standard tractor housing is indicated at 1, and encloses the main shaft 2, such main shaft being regularly provided with a bevel gear 3.

The attachment comprises an outer stationary sleeve 4 which is provided with a flange 5 adapted for attachment to the casing 1. The sleeve 4 projects into the casing 1 a slight distance and outwardly therefrom. It is provided with an outer internally machined portion 6 and with a similar inner internally machined surface 7. These surfaces 6 and 7 provide bearing surfaces for a slidably mounted inner sleeve 8 which is accordingly provided with machined surfaces, as illustrated in Figure 1, which slide within the surfaces 6 and 7. The stationary portions of the outer race 9 of ball bearings are rigidly carried by the inner sleeve 8 and the inner race or movable portions 10 are carried by the pulley shaft 11. An annular cap 12 closes the space between the pulley hub and the sleeve 8 and prevents loss of oil. The outer end of the shaft 11 is splined and receives the standard pulley 13, such pulley being locked in place by means of a nut 14 screwed upon a reduced threaded extension 15 of the shaft.

The inner end of the shaft carries a bevel gear 16 adapted to mesh with the bevel gear 3.

The means for shifting the sleeve 8 may take any desired form. For instance, a plug 17 may be revolubly mounted within a boss 18 formed in the stationary sleeve 4. This plug is retained in place by means of a groove 19 and retaining screw 20. It is adapted either for permanent or removable attachment to an operating crank 21. The lower end of the plug is provided with an eccentric pin 22 which cooperates with an aperture formed in the sleeve 8 to shift the sleeve as the plug is rotated to 180°.

A small boss 22' is provided on the upper side of the sleeve 4 and carries an oiler 23. A small pipe 24 extends from the oiler to an aperture 25 formed in the stationary sleeve and normally closes when the gears are in mesh. This aperture 25 is adapted to register with an aperture 26 formed in the movable sleeve 8 when the gears are out of mesh and the sleeve is slid to the right in Figure 1. This construction permits the ready oiling of the ball bearings at the outer end of the sleeve and prevents the free feeding of oil to these bearings while they are in operation, for it is well known that when the bearings are running the oil is dissipated to a certain extent. Thus loss of oil is guarded against.

Figure 3:
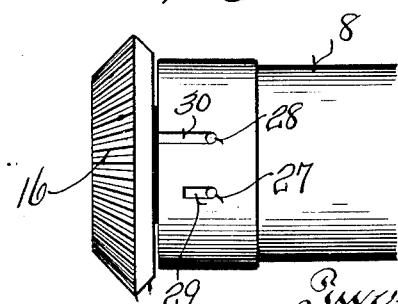
Figure 3 is a bottom view of a portion of the attachment detached from its associated parts.

The inner end of the sleeve 8 is provided with a pair of apertures 27 and 28, the aperture 27 communicating with a relatively short slot 29, and the aperture 28 communicating with a relatively long slot 30 opening through the outer end of the sleeve 8, as most clearly shown in Figure 3. When the gears are in mesh, oil is splashed upwardly and also through the bearing at the inner end of the sleeve 8 and passes into such sleeve, thus freely oiling the parts. However, the oil is returned through the apertures 27 and 28, and the slots 29 and 30, it being noted that two passageways are provided for the return of the oil when the gears are in mesh. When the sleeves 8 are moved to the right and the gears are thrown out of mesh, the short slot 27 is closed by the stationary portion of the sleeve 4 and the oil is allowed to slowly drain through the aperture 28 and the elongated slot 30.

In order to prevent loss of oil due to the tilting of the tractor downwardly towards the pulley side, a sleeve 31 is rigidly carried by means of an inwardly extended web or flange 32 preferably formed integrally with the movable inner sleeve 8. This sleeve 31 is spaced from the shaft 11 and may contact, if desired, with the inner raceway 10 of the outer ball bearing. Even if the tractor should suddenly tilt to the side and the upper surface of the oil occupy a slanting position such upper surface would not pass beyond the dotted line indicated at 33 in Figure 1, and consequently would not flow into the sleeve 31.

It is to be noted from reference to Figure 1 that an annular groove is formed in the movable sleeve 8 adjacent its inner end, and that an oil packing ring 34 is positioned within such groove and contacts with the machined surface 7 of the stationary sleeve 4. Thus loss of oil due to tilting of the tractor is wholly avoided.

It will be seen that an attachment for a tractor has been provided which will control the operation of the belt pulley, and which is provided with a novel form of oiling means adapted to insure the adequate oiling of the parts, and also to effectively prevent loss of oil even under unusual conditions.

It will be seen further that a very simple and serviceable type of attachment has been provided, which may be most easily constructed and readily assembled.

Although the invention has been described in considerable detail, it is to be understood that the invention may be variously embodied and is, therefore, to be limited only as claimed.

I claim:

1. The combination of a tractor provided with a casing, a drive shaft and a bevel gear carried by said drive shaft, and an attachment comprising a stationary sleeve rigidly carried by said casing, a movable sleeve slidably mounted within said stationary sleeve, means for sliding said movable sleeve inwardly or outwardly, ball bearings carried adjacent the outer end of said movable sleeve, a pulley shaft mounted within said ball bearings and having a bevel gear at its inner end and power transmitting means at its outer end, means for oiling the outer of said ball bearings when said movable sleeve is slid outwardly, said movable sleeve having means for returning oil to said casing in a greater volume when said movable sleeve is in its innermost position than when said movable sleeve is in its outermost position.

2. The combination of a tractor provided with a casing, a drive shaft and a bevel gear carried by said drive shaft, and an attachment comprising a stationary sleeve rigidly carried by said casing, a movable sleeve slidably mounted within said stationary sleeve, means for sliding said movable sleeve inwardly or outwardly, ball bearings carried adjacent the outer end of said movable sleeve, a pulley shaft mounted within said ball bearings and having a bevel gear at its inner end and power transmitting means at its outer end, means for oiling the outer of said ball bearings when said movable sleeve is slid outwardly, said movable sleeve having means for returning oil to said casing in a greater volume when said movable sleeve is in its innermost position than when said movable sleeve is in its outermost position, and a relatively small sleeve rigidly carried by said movable sleeve adjacent its outer end, and surrounding said pulley shaft, the inner end of said last mentioned sleeve being spaced from the innermost of said ball bearings.

In testimony that I claim the foregoing I have hereunto set my hand at Plymouth, in the county of Sheboygan and State of Wisconsin.

RICHARD W. ROBERTSON.